May 9, 1967

C. E. TAYLOR 3,318,999

CATHODE RAY TUBE MOUNTING DEVICE

Filed April 29, 1964

INVENTOR:
CHARLES E. TAYLOR,

BY Donald N. Timbie
HIS ATTORNEY.

United States Patent Office 3,318,999

Patented May 9, 1967

3,318,999

CATHODE RAY TUBE MOUNTING DEVICE

Charles E. Taylor, Liverpool, N.Y., assignor to General Electric Company, a corporation of New York Filed Apr. 29, 1964, Ser. No. 363,536
1 Claim. (Cl. 178—7.8)

Figures 1, 4:
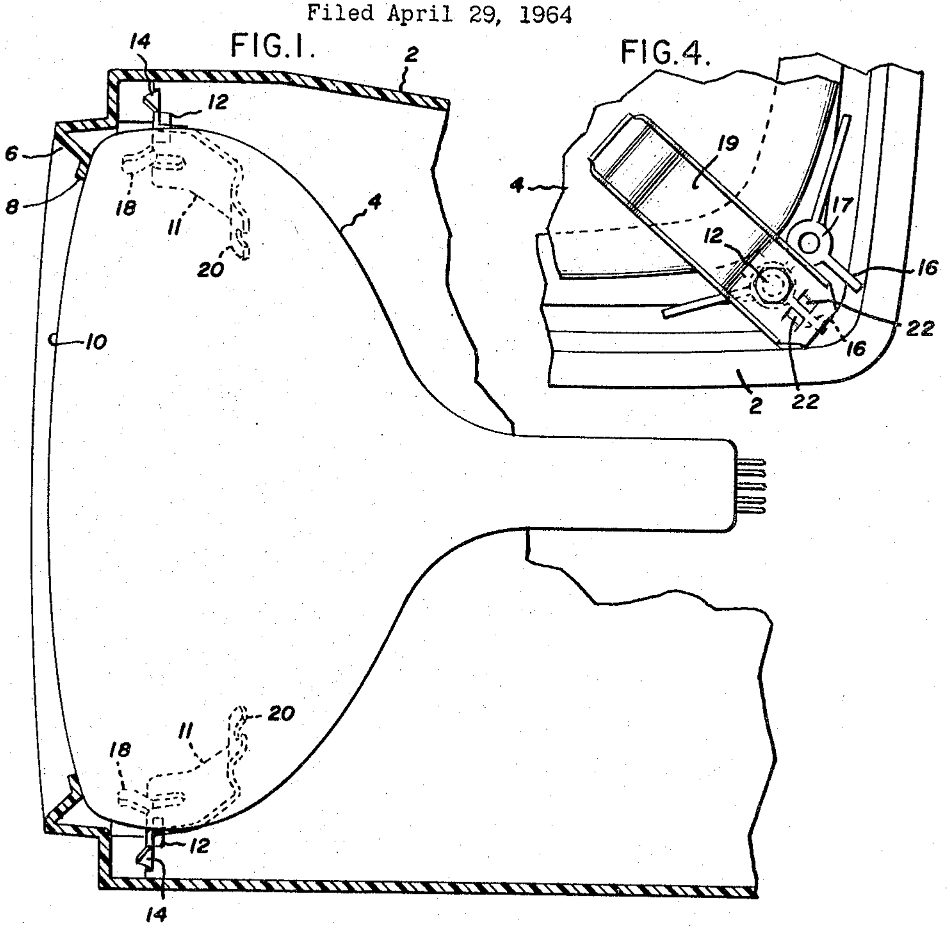

This invention relates to means for mounting a cathode ray tube to the cabinet of a television receiver or the like.

An object of the invention is to provide an improved means for mounting a cathode ray tube in a cabinet which is inexpensive, adaptable to tolerance variations in certain dimensions of the cathode ray tube, and capable of withstanding considerable shock.

In accordance with the invention, these objectives are achieved as follows. As is well known, the cathode ray tubes which form the television image have a bulbous portion, the larger end of which joins the periphery of a face plate on which the image is formed, and a smaller end that is attached to a cylindrical neck in which the electron gun assembly is mounted. The face plate of the cathode ray tube is held against the edge of the opening in the cabinet through which the image on the face plate is viewed by spring clips. In one form of the invention, the clips are prevented from rotating by tabs that fit on either side of a rib to which the clip is attached. The edge of the tube is engaged by knocked out tongues located near the tabs and the clip is shaped so that a curved end remote from the tabs presses against the rear of the bulbous portion and urges the cathode ray tube forward against the rear of the opening in the cabinet.

Figure 2:
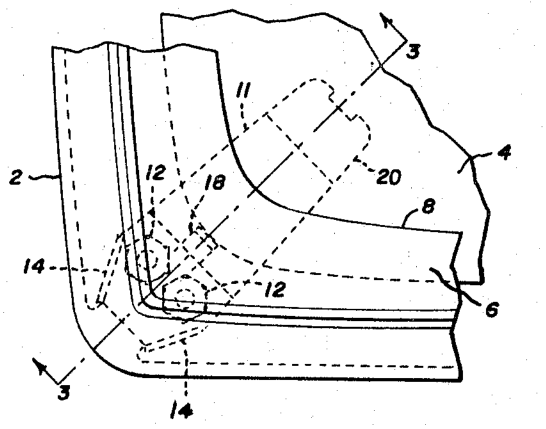
Figure 3:
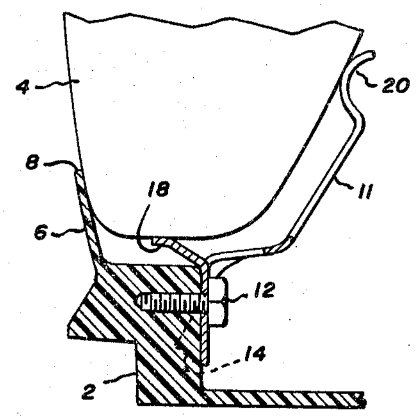

The manner in which the objectives are achieved in accordance with this invention will be clearer after consideration of the specification in conjunction with the drawing in which:

FIGURE 1 is a vertical sectional side view of a cathode ray tube mounted within a television receiver cabinet, FIGURE 2 is a cut-away front view of the cabinet, FIGURE 3 is a section 3—3 of FIGURE 2, and FIGURE 4 shows a clip of different configuration in its assembled position.

In FIGURE 1 the television receiver cabinet 2 is shown in section along a vertical plane through the axis of the cathode ray tube 4, the latter being shown in outline form. The opening through which the image on the cathode ray tube is viewed is defined by a frame 6, the inner edge 8 thereof being shaped so as to conform to the front surface of the face plate 10 of the cathode ray tube 4. The clip 11 illustrated in FIGURES 1, 2 and 3 is secured to the cabinet by two bolts 12 extending through an intermediate portion thereof. The tabs 14, formed by bending over the corners of the clip material aid in aligning the holes for the bolts 12 in a manner best described in connection with the rib structure formed in the cabinet illustrated in FIGURE 4. When the tabs 14 are placed outside of ribs 16 and one hole in the clip is aligned with the hole in the land 17, the other hole in the clip is aligned with the other hole in the land 17.

The cathode ray tube 4 is held firmly in position by a plurality of clips mounted at various points around its periphery. As can be seen from the drawings, the particular cathode ray tube illustrated has a face plate of substantially rectangular configuration and the clips are mounted at each of the four corners. Each clip is provided with a tongue 18 that is struck out from the metal of the clip. The tongue so shaped and bent that when the clip is mounted it extends toward the face plate 10.

The other end of the clip 11 is bent to form an elbow 20. The tongues 18 support the cathode ray tube 4 in proper alignment with the opening in the cabinet and the elbows 20 press against the rear of the bulbous portion of the cathode ray tube 4 and urge it axially forward against the inner edge 8 of the frame 6. It is noted that the tongues 18 make contact with a portion of the cathode ray tube 4 that is nearly parallel to the axis of the tube so as to permit it to be moved forward by the force exerted by the elbows 20. Some bending of the tongues 18 may result if the cathode ray tube 4 is curved, as shown in FIGURE 1, at the point of contact with the tongue 18. If the cabinet is dropped so as to produce reaction forces on the tongues 18 and the elbows 20 in a direction perpendicular to the axis of the tube 4, the tongues tend to balance so as to reduce the torque applied to the bolts 12, and hence prevents the application of larger forces to the lands 17.

FIGURE 4 illustrates a different form of a clip 19 constructed in accordance with this invention. Only one bolt 12 is used to fasten the clip to the land 17 and rotation of the clip is prevented by fingers 22 which are struck out from the material of the clip. The fingers 22 are located and shaped so as to make contact with opposite sides of one of the ribs 16. The rest of the clip 19 functions in the same way as the clip 11 shown in FIGURES 1, 2 and 3 to hold the cathode ray tube in its desired position.

While I have illustrated and described and have pointed out in the annexed claim certain novel features of my invention, it will be understood that various omissions, substitutions and changes in the forms and details of the system illustrated may be made by those skilled in the art without department from the spirit of the invention and the scope of the claim.

What I claim as new and desire to secure by Letters Patent in the United States is:

In combination a cabinet having means defining an opening therein, a cathode ray tube including a bulbous portion having a funnel shaped portion and a faceplate secured to the enlarged end thereof by means of a generally cylindrical member, said cathode ray tube positioned with said faceplate abutting said opening defining means and with the axis thereof generally perpendicular to the plane of said opening, a plurality of clips, each of said clips having a tongue portion at one end thereof and an elbow portion at the other end thereof, each of said plurality of clips having a portion intermediate the tongue portion and the elbow portion thereof secured to said opening defining means, each of said tongue portions engaging the generally cylindrical member of said tube to restrain movement of said bulbous portion in a direction perpendicular to the axis thereof, each of said elbow portions engaging the funnel shaped portion of said tube to restrain movement of the tube in conjunction with said opening defining means in a direction parallel to the axis of said tube.

References Cited by the Examiner

UNITED STATES PATENTS

| | | | |
|---|---|---|---|
| 2,654,880 | 10/1953 | Kramer | 178—7.8 |
| 3,240,985 | 3/1966 | Ammerman | 178—7.82 |

DAVID G. REDINBAUGH, *Primary Examiner.*

J. ORSINO, *Assistant Examiner.*